July 7, 1959 W. D. ALLISON 2,893,750
TORSIONAL SPRING SUSPENSION FOR VEHICLES
Filed Sept. 6, 1956 4 Sheets-Sheet 2

INVENTOR.
William D. Allison
BY
Elmer Jamison Gray
ATTORNEY.

July 7, 1959  W. D. ALLISON  2,893,750
TORSIONAL SPRING SUSPENSION FOR VEHICLES
Filed Sept. 6, 1956  4 Sheets-Sheet 4

INVENTOR.
William D. Allison.
BY
Oliver Jamison Gray
ATTORNEY.

ved for use in light cars, the invention enabling

United States Patent Office 2,893,750
Patented July 7, 1959

2,893,750

TORSIONAL SPRING SUSPENSION FOR VEHICLES

William D. Allison, Grosse Pointe Farms, Mich.

Application September 6, 1956, Serial No. 608,396

23 Claims. (Cl. 280—104)

This invention relates to motor vehicles and particularly to improvements in the spring suspensions therefor. The invention is applicable to various types of motor vehicles such as automobiles of the pleasure or passenger types, busses, trucks, ambulances and commercial vehicles. For the purposes of illustration the invention has been shown herein as embodied in a motor vehicle having a chassis adapted to be utilized in a passenger or pleasure type automobile.

One of the principal objects of the present invention is to provide a spring suspension for a motor vehicle capable of improving the riding characteristics of the vehicle, increasing the comfort of the driver and passengers especially when the vehicle travels over rough roads, and rendering the vehicle safer to handle over rough terrain while reducing materially serious stresses to which the frame is subjected in the use of motor vehicles, particularly those equipped with conventional solid axle rear suspensions.

Another important object of the invention is to provide a simplified and improved spring suspension especially advantageous for use in light cars, the invention enabling a light relatively cheap car to be produced which will have riding characteristics at least comparable to or superior to those of relatively heavy, long wheel base cars of expensive makes.

Another object of the invention is to provide an improved spring suspension for a motor vehicle having front and rear wheels comprising a main spring means, preferably torsion bar spring means, connecting a front and a rear wheel at the same side of the vehicle and adapted to transmit vertical forces in corresponding directions to the vehicle frame adjacent opposite ends thereof in response to vertical motion of either wheel. By virtue of the main spring suspension which is common to the front and rear wheels much softer or lower rate springs may be utilized, thereby improving the riding qualities of the vehicle.

A further object of the invention is to provide, in addition to a main spring suspension, a load compensating spring means, preferably of the torsional kind, connected to one of the wheels, such as the rear wheel, and adapted to be adjusted or torsionally deflected to vary the spring resistance adjacent one end of the frame relative to the opposite end thereof so as to compensate for varying static loads. As a result of this feature of the invention it is possible to maintain the average effective riding height of the vehicle body substantially constant within the range of the load capacity of the spring suspension regardless of whether the vehicle is empty or whether varying loads are carried thereby.

In the illustrated embodiments of the invention the main torsional spring means, which may be a single torsion bar of solid or tubular construction, is connected, for example, to the inner end of the lower swinging suspension arm for the front wheel. This spring means preferably extends continuously and rearwardly for connection with the rear wheel at the same side of the vehicle, this construction having the additional advantage of resisting body roll or side sway. The rear end of the main torsional spring means, in the illustrated embodiments, is attached to a transverse swinging lever arm adjacent the inner end of the latter, and this lever arm is adapted to be swung in opposite directions, preferably up and down, to deflect the torsional spring means. This is accomplished by means of longitudinally extending wheel actuated lever arm means responsive to vertical motion of the rear wheel. In the present embodiments the longitudinally extending lever arm means is connected at its rear end either to the rear wheel or the rear axle, this lever arm means being pivoted or trunnioned intermediate its ends on the frame and having the forward end thereof connected to the outer end of the transverse lever arm which is attached at its inner end to the main torsional spring means. By virtue of this construction up and down movement of the rear wheel will torsionally deflect the main torsional spring means in directions opposite to the torsional deflection thereof produced by corresponding up and down movements of the front wheel. In the present embodiments the load compensating spring means is also attached adjacent one end to the same lever arm that the main spring means is attached. In order to vary the spring resistance of the load compensating spring means there is preferably provided power driven means for torsionally deflecting the same in either direction.

This application is a continuation-in-part of my application Serial No. 236,940, filed July 16, 1951 and allowed March 13, 1956 and now abandoned.

Other objects of this invention will appear in the following description and appended claims, reference being had to the accompanying drawings forming a part of this specification wherein like reference characters designate corresponding parts in the several views.

Fig. 6 is an enlarged fragmentary view, partly in section, of the structure bounded by the broken line circle 6 in Fig. 2.

Fig. 8 is a fragmentary sectional elevation taken substantially through lines 8—8 of Fig. 7 looking in the direction of the arrows.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

Referring to the accompanying drawings, there is illustrated, by way of example, a vehicle chassis having road wheels supporting a chassis frame or body through a spring system which is preferably of the torsional kind. Although the rear wheels in the illustrated embodiments are either independently sprung or mounted upon a solid axle or transverse member, it will be understood that the invention in its broader aspects is applicable to a vehicle in which the rear wheels are otherwise mounted. In the interest of clarity the vehicle super-structure or body, power plant and power train have been omitted in the drawings.

Referring to the embodiment illustrated in Figs. 1 to 6 inclusive, the chassis or body frame is shown, by way of example, as comprising spaced longitudinal sills or frame members 15 rigidly connected together by means of a drop type front cross member 16 and a second front cross member 17 adjacent thereto. In addition, there are provided an intermediate cross member 18 and a rearward cross member 19 rigidly attached to the longitudinal frame members. The vehicle is provided with a pair of front dirigible wheels 20 and a pair of rear driven wheels 21.

Figure 1:
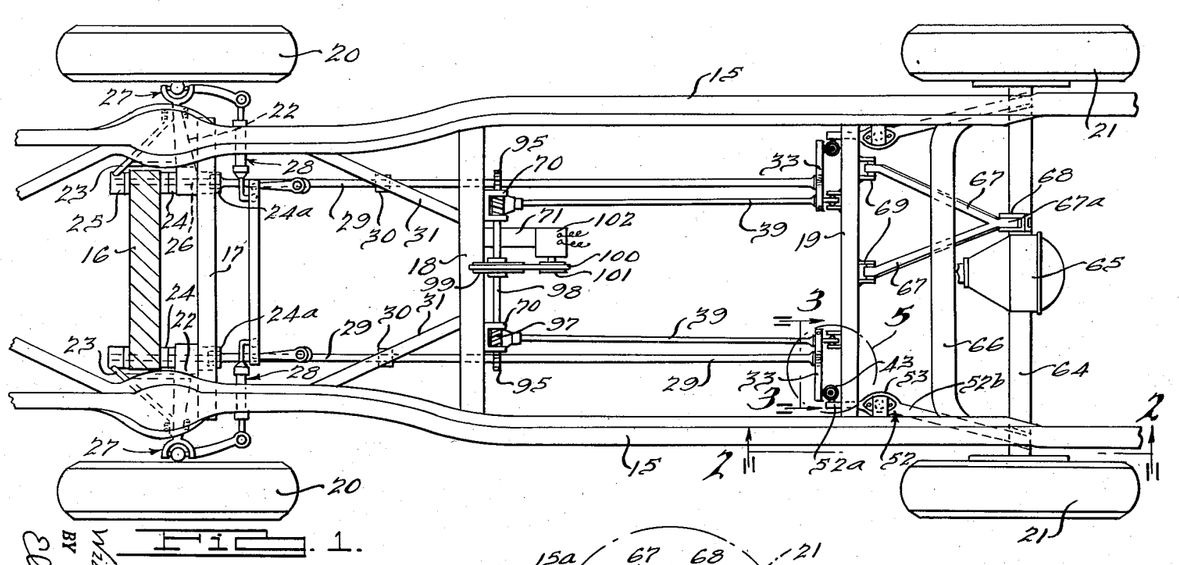
Fig. 1 is a fragmentary plan view, partly in section, of a motor vehicle chassis provided with a spring suspension constructed in accordance with one embodiment of the present invention.

Each front wheel 20 in accordance with conventional practice is supported from the frame for up and down movement by means of upper short and lower long swinging suspension arms which are preferably of wish-bone construction. As shown in Fig. 1 the front lower suspension arms are indicated at 22. Attached to each of these arms near the outer end thereof is a brace bar 23 extending angularly and forwardly therefrom. Welded to the inner ends of each associated suspension arm 22 and brace bar 23 are bearing sleeves 24 and 25. Welded to the rear side of the inner end of suspension arm 22 is a bearing sleeve 24a. The foregoing associated bearing sleeves for each wheel are pivotally mounted on a spindle or shaft 26 which is rigidly attached to cross frame members 16 and 17. Each spindle or shaft 26 thus provides the inner pivotal mounting for the up and down swingable suspension arm for each wheel. The outer end of each suspension arm 22 is joined at its outer end to a wheel 20 by a conventional spindle and king pin mounting or carrier 27 connected also to the upper wheel suspension arm and to which the steering mechanism, generally indicated at 28, is connected. From the foregoing it will be seen that the lower suspension arm, comprising members 22 and 23, for each dirigible front wheel is mounted to swing up and down upon the spindle or shaft 26, such movement being caused by up and down displacement of the front wheel.

Each rear bearing sleeve 24a attached to suspension arm 22 is formed with a hex socket within which an enlarged front hex end of a longitudinal spring torsion bar 29 has a sliding fit. The torsion bars 29 extend longitudinally and rearwardly in parallel relation from their front socket connections to the pairs of wheel suspension arms 22, 23. Each torsion bar is preferably guided intermediate its ends by a bracket 30 forming a bearing support for the round bar and carried by an angle frame member 31 therebeneath. The torsion bar preferably extends through a hole in bracket 30 with a rubber bushing between the bar and the bracket.

Figure 2:
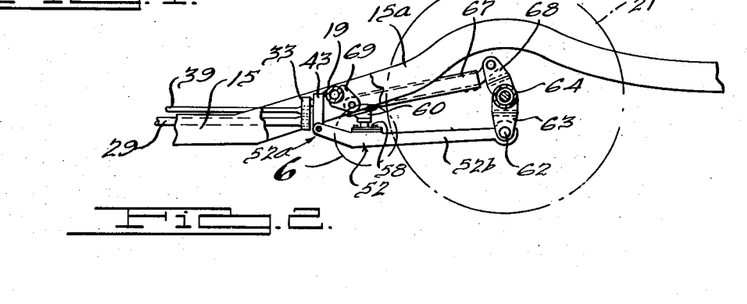
Fig. 2 is a fragmentary sectional elevation taken substantially through lines 2—2 of Fig. 1 looking in the direction of the arrows.
Figures 2, 3, 4, 5:
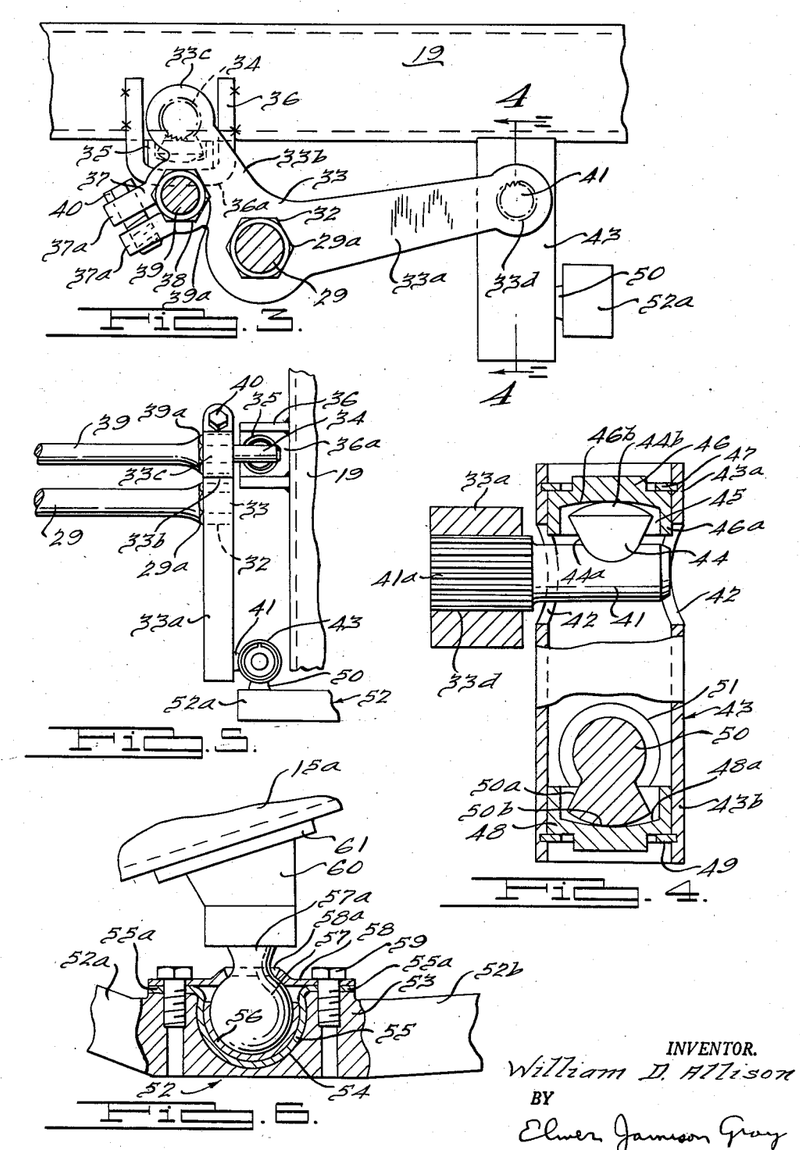
Fig. 3 is an enlarged fragmentary transverse sectional elevation taken substantially through lines 3—3 of Fig. 1 looking in the direction of the arrows.
Fig. 4 is an enlarged fragmentary sectional view taken substantially through lines 4—4 of Fig. 3 looking in the direction of the arrows.
Fig. 5 is an enlarged fragmentary view of the structure bounded by the broken line circle 5 in Fig. 1.

Referring to Figs. 3 and 5, the rear end of each main torsion spring bar 29 is formed with an enlarged hex end portion 29a similar to the hex end portion at the front end of the bar. Each rear hex end 29a has a sliding fit within a correspondingly shaped socket 32 in an up and down swingable bell crank lever 33 extending outwardly at right angles to the torsion bar. Each lever 33 is provided with an outwardly extending swingable load arm 33a and an inwardly and upwardly inclined lever arm 33b (Fig. 3) which terminates in an arcuate end portion 33c. A pivot stud or stub shaft 34 has its forward end splined or anchored in a hole in the inner end 33c of each lever 33. The rear end portion of stud 34 extends through and is revolubly or pivotally carried by an upstanding annular bearing support 35 disposed between the vertically extending spaced flanges 36 of a U-shaped bracket and welded to the bottom web 36a thereof. Each bracket is welded to the front side of cross frame member 19.

Inwardly of each main torsion bar 29 and at a point higher than the latter (Fig. 3) the bell crank lever arm 33b is formed with an inner inclined boss or protuberance 37 and is provided at this locality with a hex socket 38 of smaller size than the hex socket 32.

In the present embodiment of the invention each main torsion bar 29 is supplemented by means of a compensating torsion bar 39 at each side of the vehicle for the purpose of additionally springing the rear wheels and providing means for compensating for varying static loads. The compensating torsion bars 39, two being provided in the present instance, as in the case of the main torsion bars 29 are selected as to cross sectional size and torsional characteristics to suit the particular vehicle and function to increase or decrease the spring resistance at the rear of the vehicle so as to maintain the rear end of the vehicle at a substantially constant average riding height. The load compensating bars 39 are shown in the present embodiment for the rear end of the vehicle only since in present-day automobiles most of the passenger and baggage loads are concentrated at the rear. However, it will be understood that where loads are distributed substantially evenly to the front and rear wheels, the bars 39 may be duplicated for the front wheels and operated in the same manner as hereinafter described or as disclosed in my above referred to Patent No. 2,607,610.

Each load compensating bar 39 is preferably of smaller diameter than the associated main torsion bar 29 and, as illustrated in Figs. 3 and 5, is provided at its rear end with an enlarged hex portion 39a having a snug sliding fit within the hex socket 38. In the present instance the hex sockets 32 and 38 for the torsion bars 29 and 39 are in close proximity and each compensating torsion bar 39 extends longitudinally closely adjacent and inwardly of the associated main torsion bar 29. As illustrated in Fig. 3, each inclined boss or protuberance 37 has split arm portions 37a which are connected together by means of an adjusting bolt 40 which may be adjusted so as to draw the arms 37a toward each other and thereby clamp the hex end 39a of the load compensating bar in the hex socket 38.

The load arm 33a of the bell crank torsion lever 33 has its enlarged outer end formed with a splined socket 33d (Fig. 4) receiving the enlarged splined end 41a of a bearing stud 41. This stud extends freely into a pair of opposed apertures 42 in a cylindrical or tubular vertical connecting link 43, these apertures having diameters materially greater than the diameter of stud 41. The stud 41 carries, preferably integrally therewith, an upwardly extending bearing member or stud portion 44 formed with an upwardly flaring outer wall 44a terminating in a convex upper bearing portion or surface 44b. The bearing 44 is disposed within an annular recess 45 in a bearing member 46, the diameter of the stud at the upper edge of the flaring wall 44a being materially less than the diameter of the annular wall 46a forming the recess 45. This recess terminates in a convex bearing surface 46b with which the convex bearing surface 44b of the stud member 44 has rolling engagement. It will be seen that the bearing 46 is in the form of an inverted cup-shaped member receiving the bearing stud 44. This bearing member 46 is fitted, or press-fitted if desired, into the upper end 43a of the vertical connecting link 43, and is retained in position by means of a snap-on retaining ring 47 fitting into an annular groove in the cylindrical upper end 43a of the connecting link.

Within the lower end 43b of the vertical connecting link 43 is mounted a bearing member 48 similar to the bearing member 46 but reversed with respect thereto. This lower cup-shaped bearing member 48 is fitted, or press-fitted if desired, into the lower end 43b of connecting link 43 and retained in position by means of a snap-on retaining ring 49. The lower bearing member 48 is provided with a concave bearing surface 48a similar to the bearing surface 46a. A bearing stud 50, similar to the stud 41, extends through opposed enlarged apertures in the connecting link 43, similar to the apertures 42, one of these apertures for the stud 50 being shown at 51 in Fig. 4. The bearing stud 50 has a downwardly flaring annular wall 50a terminating in a convex bearing surface 50b, this construction being the same as the construction of the upper bearing stud 41, 44. The convex bearing surface 50b engages the concave bearing surface 48a.

From the foregoing it will be seen that the upper stud 41 attached to the arm 33a has rolling pivotal engagement with the connecting link 43 through the medium of the arcuate engaging surfaces 44b and 46a. In like manner the lower bearing stud 50 has rolling pivotal engagement with the lower end of the connecting link 43 through the medium of the arcuate bearing surfaces 48a and 50b.

Referring particularly to Figs. 1, 2 and 6, there is provided for each rear wheel a longitudinally extending pivotally mounted wheel actuated lever or torque member 52 having a forward up and down swingable arm 52a. To the forward end of this arm is splined the bearing stud 50 which extends at right angles thereto, this construction being the same as illustrated in Fig. 4 with respect to the bearing stud 41 splined within the splined end socket 33d of the load arm 33a. Thus, the adjacent ends of each load arm 33a and swingable arm 52a have identical rolling pivotal connections to the associated vertically extending link 43. This construction thus enables link 43 to move relatively to both ends of arms 33a and 52a during simultaneous vertical swinging motion thereof in different arcs of travel.

Each wheel actuated lever 52, see Fig. 6, is formed at the rear end of its arm 52a with an enlarged bearing portion 53 formed with an arcuate socket 54. Fitting into this socket is an arcuate bearing liner 55 terminating in opposed attaching flanges 55a overlying the bearing portion 53. Freely mounted and fitting within the liner 55 is an arcuate inner bearing 56 smoothly engaged by a ball stud 57. This stud is integrally carried by a shank 57a extending freely through an annular opening 58a in an anchor plate 58 overlying the flanges 55a, both of which being secured to the bearing portion 53 by screw bolts 59. The annular opening 58a has an upwardly flared edge spaced outwardly from ball shank 57a so as to permit the maximum needed rolling pivotal motion of the wheel actuated lever 52 in response to vertical displacement of the associated rear wheel. Each ball stud shank 57a is secured to a depending attaching bracket 60 having an integral angle member 61 rigidly secured to the inclined base of the adjacent upwardly inclined rear portion 15a of the adjacent frame member 15.

Extending rearwardly from the bearing portion 53 of each wheel actuated lever 52 is an arm 52b which in the present instance is integral with and forms a continuation of the arm 52a. As illustrated in Fig. 2 the rear enlarged end of arm 52b is pivoted at 62 to the lower end of a depending bracket or hanger member 63 secured at its upper end to an end of a tubular transverse axle section 64. Opposite ends of the axle sections are revolubly connected to the rear wheels 21 in any conventional manner. The ends of the axle sections have up and down travel transmitted to them by the rear wheels, such travel corresponding to the vertical displacement of these wheels. This up and down travel or displacement of the rear wheels is, therefore, correspondingly transmitted through hanger members 63 to the ends of the rear lever arms 52b, thereby swinging the levers 52 about their pivotal bearings 55—57. It will be apparent that each forward lever arm 52a will be swung in vertical directions opposite to the rear lever arm 52b, hence transmitting through connecting link 43 and lever arm 33a to torsion lever 33 an up and down swinging motion opposite to the up and down travel or displacement of the rear wheel.

Although the front lower suspension arm or torsion lever 22 and the rear torsion lever 33 at each side of the vehicle are attached to and extend in corresponding directions outwardly from opposite ends of the associated torsion bar 29, it will be apparent that these torsion levers will be operated to torsionally deflect or twist the ends of the torsion bar 29 in opposite directions in response to corresponding vertical displacement of the front and rear wheels. Thus, for example, upward displacement of a rear wheel 21 will, through lever 52, swing torsion bar lever 33 downwardly thereby torsionally deflecting the rear end of torsion bar 29 in one direction. On the other hand, upward displacement of the front wheel 20 at the same side of the vehicle will swing suspension arm or torsion lever 22 upwardly thereby torsionally deflecting the front end of the same torsion bar 29 in the opposite direction.

The usual drive shafts extend through the axle sections 64 and are connected to the customary differential mechanism in a differential housing 65. Connecting the ends of the axle sections 64 is a transversely extending tubular torque member 66. Forwardly diverging torque arms 67 have their rear joined ends 67a pivoted to a bracket 68 secured to the rear axle 64. The forward ends of the diverging torque arms 67 are pivoted to brackets 69 attached to frame cross member 19.

Figure 9:
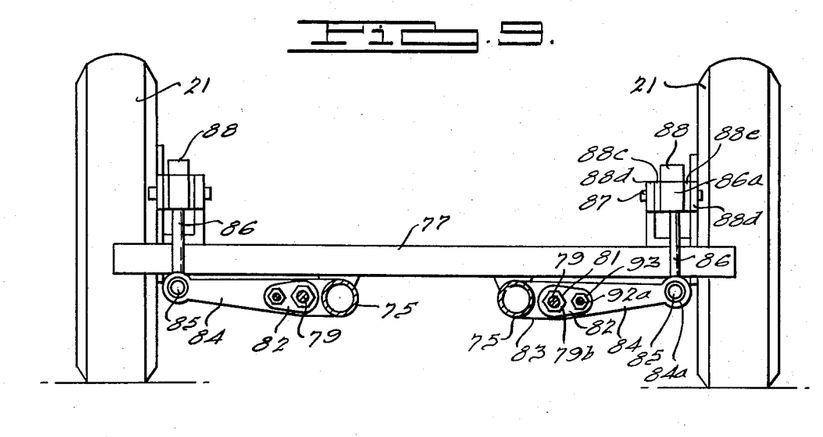
Fig. 9 is an enlarged transverse sectional elevation taken substantially through lines 9—9 of Fig. 7 looking in the direction of the arrows.
Figure 10:
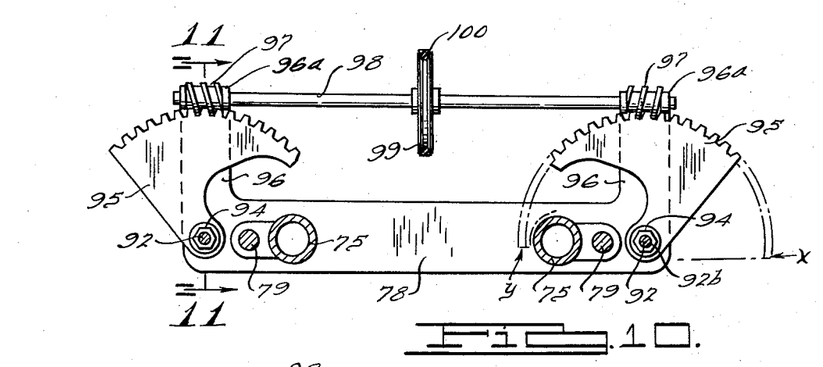
Fig. 10 is an enlarged sectional elevation taken substantially through lines 10—10 of Fig. 7 looking in the direction of the arrows.
Figure 11:
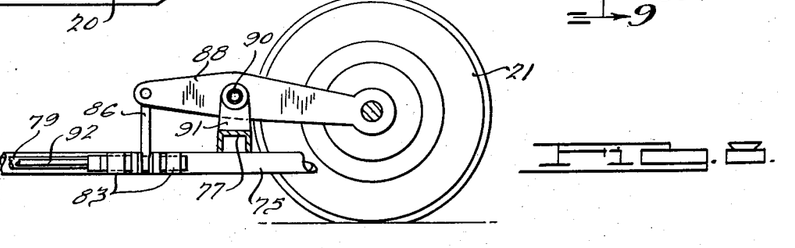
Fig. 11 is a vertical fragmentary sectional view taken substantially through lines 11—11 of Fig. 10 looking in the direction of the arrows.

The mechanism connected to the forward ends of the compensating torsion bars 39 for simultaneously adjusting these bars torsionally in opposite directions is substantially the same as in the second embodiment hereof illustrated in Figs. 7 to 11 and with particular reference to Figs. 10 and 11. Accordingly, in respect to such mechanism in the first embodiment reference is made to the description and disclosure pertaining to such mechanism in the second embodiment.

Referring to Fig. 1, substantially the only differences between the supporting and operating mechanism for the front ends of the compensating torsion bars and the corresponding mechanism in the second embodiment reside in the positioning and supporting of the compensating bars 39 inwardly of the main bars 29 through upstanding channel brackets 70 disposed inwardly of the ends of cross frame member 18 and secured thereto, also the mounting of the reversible electric motor upon a supporting bracket 71 attached to the cross frame member 18.

Figure 7:
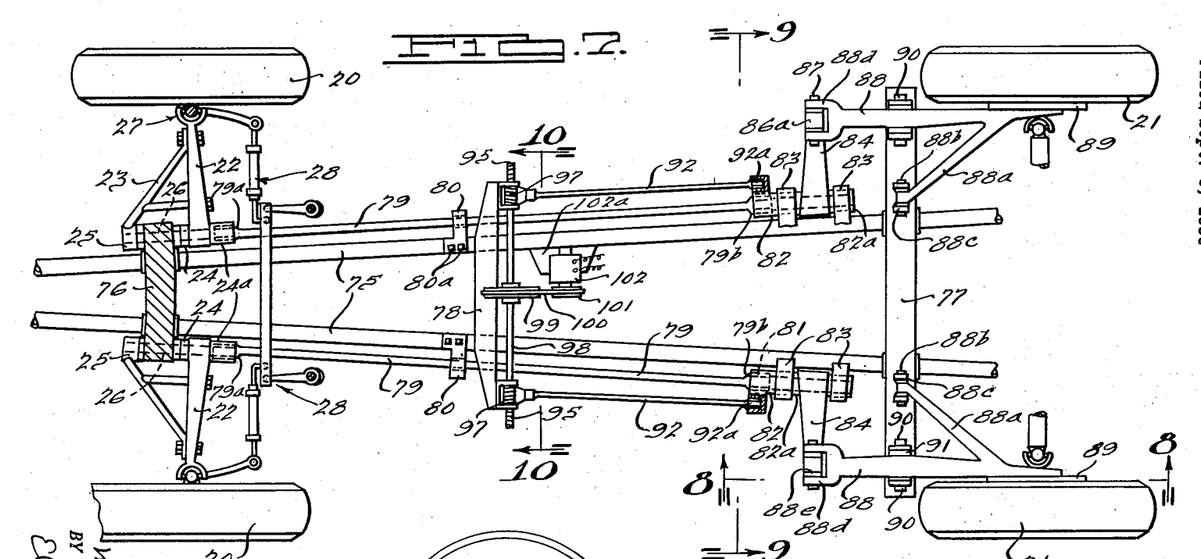
Fig. 7 is a fragmentary plan view, partly in section, of a motor vehicle chassis provided with a spring suspension constructed in accordance with a second embodiment of the present invention.

With respect to the second embodiment illustrated in Figs. 7 to 11, the chassis or body frame is shown, by way of example, as comprising spaced longitudinal sills or frame members 75 of tubular construction rigidly connected together by means of a drop type front cross member 76, a main rear cross member 77, and an intermediate cross member 78. As in the first embodiment the vehicle is provided with a pair of front dirigible wheels 20 and a pair of rear driven wheels 21. The front wheels are supported from the frame for up and down movement in the same manner as the first embodiment, such supporting means including lower up and down swingable suspension arms or torsion levers 22 and brace bars 23. Each rear socket member or bearing sleeve 24a, rigidly attached to the inner end of the suspension arm 22, also has a hex socket within which the enlarged front hex end 79a of a longitudinal spring torsion bar 79 has a sliding fit, this torsion bar corresponding to the main torsion bar 29 in the first embodiment. Each torsion spring bar 79 extends longitudinally and rearwardly from the socket 24a alongside one of the frame members 75 and is preferably guided intermediate its ends by means of a suitable bracket 80 removably bolted at 80a to one of the frame members 75, as illustrated in Fig. 7. The torsion bar preferably extends through a hole in the bracket 80 with a rubber bushing interposed between the bar and the bracket.

Referring to Figs. 7 and 9, the rear end of each main torsion spring bar 79 is formed with an enlarged hex portion 79b which has a sliding fit within a correspondingly shaped socket 81 in a double socket sleeve 82. This sleeve has a longitudinal tubular shaft extension 82a (Fig. 7) rotatably extending through aligned bearings in holes in a pair of spaced brackets 83 rigidly secured to the frame member 75. A laterally extending up and down swingable lever arm 84 for each rear wheel 21 is provided with an opening at its inner end receiving the extension 82a and rigidly secured thereto as by welding. Thus, the inner end of each lever arm 84 is rigidly secured to the double socket sleeve 82 which is rotatable in bearings in the frame brackets 83.

It will be seen that the lever arm 84 for each rear wheel extends outwardly from the longitudinal axis of the associated main torsion bar 79. The outer bifurcated end of each lever arm 84 is pivotally connected at 85 to a vertically extending connecting rod or link 86, see Fig. 9. A small amount of play between the lower end of the link 86 and the outer end of the lever arm 84 is permitted through the medium of a rubber bushing 84a which is interposed between the parts at the pivotal connection thereof. The upper end of the link or connecting rod 86 is formed with a sleeve portion 86a pivotally connected at 87 to the forward bifurcated end 88d of a swinging rear wheel carrying lever or torque arm 88. Between the pivotal connection and the parts 86a and 88d are suitable rubber bushings 88e.

The wheel carrying lever or torque arm 88 for each rear wheel 21 is rigidly attached at its rear end to a rear wheel support and spindle member 89. Each lever 88 is fulcrumed or pivoted intermediate its ends at 90 to a bifurcated bracket 91 (Fig. 8) rigidly attached to an end of the frame cross member 77. As illustrated in Fig. 7, each rear wheel carrying lever 88 may be braced by means of an angularly extending brace bar 88a which is pivoted at its forward end at 88b to an upstanding bifurcated bracket 88c rigidly attached to the frame cross member 77.

Similarly to the first embodiment of the invention each main torsion bar 79 is supplemented by means of a compensating torsion bar 92 at each side of the vehicle for the purpose of additionally springing the rear wheels and providing means for compensating for varying static loads. The compensating torsion bars 92, two being provided in the present instance, as in the case of the main torsion bars 79 are selected as to cross sectional size and torsional characteristics to suit the particular vehicle, and function to increase or decrease the spring resistance at the rear of the vehicle so as to maintain the rear end of the vehicle at a substantially constant average riding height. The load compensating bars 92 are also shown in this embodiment for the rear end of the vehicle only. However, it will be understood that the bars 92 may be duplicated for the front wheels and operated in the same manner as herein described or as disclosed in my above referred to Patent No. 2,607,610.

Each load compensating bar 92 is preferably of smaller diameter than the associated main torsion bar 79 and, as illustrated in Figs. 7 and 9, is provided at its rear end with an enlarged hex portion 92a having a snug sliding fit within a correspondingly shaped socket 93 in the sleeve 82. In the present instance the sockets 81 and 93 for the torsion bars 79 and 92 are in close proximity and each compensating torsion bar 92 extends longitudinally closely adjacent and alongside the associated main torsion bar 79. The forward end of each compensating bar 92, see Figs. 7, 10 and 11, is formed with an enlarged hex portion 92b having a sliding fit within a correspondingly shaped socket member 94 to which the lower hub portion of a sector worm gear 95 is rigidly attached, as by welding. The socket member 94 is rotatably mounted on one end of the cross member 78, the latter having an upstanding bracket portion 96 terminating in a bifurcated end portion 96a receiving a worm 97 attached to a cross shaft 98, each end of which is rotatable within the bifurcated portion 96a of the bracket 96. Secured to the shaft 98 intermediate its ends is a pulley wheel 99. A driving belt 100 passes over the wheel 99 and is driven by a pulley wheel 101 attached to the drive shaft of a small reversible electric motor 102 mounted upon a bracket 102a attached to one of the frame members 75. Operation of the electric motor, through power supplied from the battery of the vehicle, will, through the drive means 99, 100 and 101, rotate the shaft 98 in one direction or the other, thereby rotating the sector gears 95 through the medium of the worms 97 mounted at opposite ends of the shaft. Since each sector gear 95 has a splined attachment at 94 to the hex end 92b of one of the compensating torsion bars 92, rotation of the sector gears will torsionally deflect or twist the bars 92 in one direction or the other. The worms 97 meshing with the worm teeth on the sector gears provide a self-locking construction in which the sector gears are locked by means of the worms in any angularly adjusted position thereof. As a result of this construction the compensating torsion bars 92 may be simultaneously adjusted torsionally in opposite directions in a positive manner to any degree of deflection desired and will be maintained in every adjusted position by the self-locking worms 97.

From the foregoing it will be seen that up and down motion of the rear wheels 21 will result in rocking or swinging the wheel supporting levers or torque arms 88, 88a about a common transverse pivotal axis extending through the pivots 90, 88b of the levers on the frame cross member 77. The forward ends of the levers 88 will move vertically in directions opposite to the wheels 21 and this vertical motion of the forward ends of these levers will be transmitted through the connecting links 86 to the lever arms 84, thereby swinging or rocking the same up and down about the inner pivotal axes thereof which extend through the tubular shaft extensions 82a. As a result of the up and down motion of the lever arm 84 the torsional deflection of the torsion bars 79 and 92 will be varied thereby varying the spring resistance at each rear wheel. Since the main torsion bars 79 are common to the front and rear wheels it will be apparent that the spring rate of these torsion bars may be substantially half the spring rates required for conventional vehicles having independent springs for all four wheels. It will be understood that the foregoing applies fully to the first embodiment.

Since the forward ends of the main torsion bars 79 are attached to the inner ends of the lower suspension arms 22 for the front wheels, it will be apparent that up and down motion of these wheels will result in torsionally deflecting the bars 79 in opposite directions. Although the arms 22 and 84 attached to opposite ends of each torsion bar 79 extend outwardly in the same direction, it will be noted that up and down movement of the rear wheel will, by virtue of lever 88, torsionally deflect the main torsion bar 79 in directions opposite to the torsional deflection thereof produced by corresponding up and down movements of the front wheel. As a consequence, either arm or lever 22 or 84 is effective to torsionally deflect the torsion bar 79 in opposition to the other arm or lever, thereby to transmit vertical forces in corresponding directions to the frame at opposite ends thereof in response to vertical motion of either wheel. Thus, when a rear wheel 21 is displaced upwardly, thereby tending to elevate the rear end of the frame, the rear end of the bar 79 will be twisted in a direction so as to exert a force tending to swing the front suspension arm 22 downwardly and depress the front wheel. Since the outer end of the suspension arm 22 is held against downward movement by the front wheel the net result is to raise the front end of the frame in a direction corresponding to the direction in which the rear end of the frame is raised by the upward movement of the rear wheel. The reverse operation occurs when the front wheel is displaced vertically relatively to the rear wheel at the same side of the vehicle. The foregoing fully applies in all respects to the first embodiment.

With respect to the illustrated embodiments it will be seen that both front and rear ends of each main torsion bar spring will be simultaneously deflected or twisted substantially in corresponding amounts when the front and rear wheel successively pass over a change in elevation, resulting in substantially equivalent vertical movements in the same directions being transmitted to opposite ends of the vehicle body and chassis. The main torsion bar spring suspension, therefore, simultaneously imparts vertical forces in corresponding directions adjacent the front and rear of the vehicle body or frame in response to vertical motion of either a front wheel or a rear wheel. As a consequence, the spring suspension will tend to maintain the chassis and vehicle body substantially level regardless of vertical movements of the front and rear wheels. Of course, it will be understood that when the front and rear wheels are simultaneously elevated both ends of the vehicle chassis and body will be raised substantially equal distances. When one front wheel is elevated and a rear wheel is lowered simultaneously, assuming the distances of elevation are equal, there will be substantially no change in lift to the vehicle sprung weight. It is important to note that the total vertical force due to a change in elevation of either front or rear wheel at one side of the vehicle is absorbed by and divided equally between the front and rear of the interconnecting main torsion bar. Thus, the average spring rate of the present spring suspension will be approximately one-half of the spring rate of a conventional automobile.

An important purpose of the load compensating torsion bars in each embodiment is to increase or decrease the total load resistance of the spring suspension at the rear of the vehicle so as to compensate for increases or decreases in the total load applied at the rear of the vehicle. In order to enable the use of compensating torsion bars of minimum diameter and also avoid any condition in which the rear end of the frame rides either above or below the normal riding height thereof, the operating means for the compensating bars is preferably constructed so as to enable each compensating torsion bar to be torsionally twisted or deflected in one direction so as to act in opposition to the associated main torsion bars when there is no load on the rear end of the vehicle additional to the normal sprung weight thereof. The main torsion bars, therefore, may be selected as to diameter and torsional spring capacity so as to carry a predetermined static load at the rear of the vehicle greater than the normal sprung weight thereof. When such static load is not present and the vehicle empty the main torsion bars would elevate the rear end of the vehicle above its normal riding height. Under such condition the compensator bars are torsionally adjusted in opposition to the main torsion bars so as to displace the rear end of the frame downwardly and dispose it at its normal riding height. Thus, when the sprung weight of the vehicle and the predetermined additional load thereon equal the resistance of the main torsion bars, the compensator bars will be entirely unstressed. Thereafter, as the static load at the rear of the frame increases, the compensator bars may be torsionally adjusted through operation of the electric motor 102 so as to supplement the resistance of the main torsion bars and thereby increase the spring resistance so as to maintain the rear end of the vehicle at its normal riding height. The construction is such, therefore, that the compensator bars may be positively torsionally adjusted in opposite directions. Referring to Fig. 10, the condition in which the compensating torsion bars 92 are unstressed and the entire sprung weight and load is carried by the main torsion bars is shown in full line positions of the sector worm gears 95. Thus, as viewed in this figure, when the sector gears are rotated to their extreme positions indicated at X, the bars 92 will be torsionally deflected in directions so as to operate in opposition to the main torsion bars. Positions X correspond to the condition when there is no load on the rear end of the vehicle in addition to the normal unsprung weight thereof. When the sector gears 95 are rotated from the full line position of Fig. 10 toward the extreme positions indicated at Y, the compensator bars 92 will be torsionally deflected to supplement the main springs 79 and increase the total spring resistance at the rear end of the vehicle. Extreme positions Y indicate a condition in which the maximum load is carried at the rear of the vehicle.

The reversible electric motor 102 may be automatically actuated in response to changes in static load on the rear of the vehicle by a delayed action limit switch mechanism and wiring circuits, not shown herein, or this motor may be operated in either direction by a switch conveniently mounted on the instrument panel of the vehicle. It will be understood that the motor 102 will operate in one direction or the other when a change in static load occurs at the rear of the vehicle. Through the belt 100 and pulleys 99 and 101 the motor will drive the shaft 98 in one direction or the other thereby rotating the worms 97. It will be noted that these worms are threaded oppositely. Hence, rotation of shaft 98 will drive the sector gears 95 one opposite to the other and thereby torsionally twist or deflect the compensator bars 92 in opposite directions. Since the rear ends of these compensator torsion bars are splined to the sleeves 82, they will exert turning effort thereon in a manner similar to the turning effort exerted by the main torsion bars.

I claim:

1. In a spring suspension for a vehicle having a frame and front and rear wheels, vertically swingable lever means connected at its inner end to the frame and at its outer end to the front wheel, vertically swingable lever means for the rear wheel pivotally connected at its inner end to the frame, spring means common to the front and rear wheels connected to said lever means and extending longitudinally of the vehicle, swinging lever means pivotally mounted on the frame and connected to the wheel and to said second named lever means to swing the same in a vertical direction opposite to the vertical direction of swinging of the first named lever means upon vertical movement of the front and rear wheels in corresponding directions, said spring means being effective upon vertical swinging motion of either of said first and second named lever means to transmit vertical forces in corresponding directions to opposite ends of the frame, compensating spring means connected to one of said first two named lever means, and means operatively connected to said compensating spring means to deflect the same and thereby vary the spring resistance adjacent one end of the frame relative to the opposite end of the frame to compensate for varying load conditions.

2. In a spring suspension for a vehicle having a frame and front and rear wheels disposed at one longitudinal side of the frame, vertically swingable lever means connected at its inner end to the frame and at its outer end to the front wheel, vertically swingable lever means for the rear wheel pivotally connected at its inner end to the frame, torsional spring means common to the front and rear wheels connected to said lever means and extending longitudinally of the vehicle, swinging lever means pivotally mounted on the frame and connected to the wheel and to said second named lever means to swing the same in a vertical direction opposite to the vertical direction of swinging of the first named lever means upon vertical movement of the front and rear wheels in corresponding directions, said spring means being effective upon vertical swinging motion of either of said first and second named lever means to transmit vertical forces in corresponding directions to opposite ends of the frame, compensating torsional spring means connected to one of said first two named lever means, and means operatively connected to said compensating spring means to deflect the same and thereby vary the spring resistance adjacent one end of the frame relative to the opposite end of the frame.

3. In a spring suspension for a vehicle having a frame and front and rear wheels, vertically swingable lever means connected at its inner end to the frame and at its outer end to the front wheel, vertically swingable lever means for the rear wheel pivotally connected at its inner end to the frame, spring means common to the front and rear wheels connected to said lever means and extending longitudinally of the vehicle, longitudinally extending swinging lever means connected at the rear end thereof to a rear wheel and pivotally connected at the forward end thereof to said second named lever means, means for pivotally mounting said third named lever means intermediate the connection thereof to the rear wheel and said second named lever means, said third named lever means being effective to swing the second named lever means in a vertical direction in response to vertical motion of the rear wheel and thereby deflect said spring means, and compensating spring means connected to one of said first two named lever means and independent of the other for varying the spring resistance adjacent one end of the frame thereby to compensate for varying load conditions.

4. In a spring suspension for a vehicle having a frame and front and rear wheels, vertically swingable lever means connected at its inner end to the frame and at its outer end to the front wheel, vertically swingable lever means for the rear wheel pivotally connected at its inner end to the frame, spring means common to the front and rear wheels connected to the inner ends of said lever means and extending longitudinally of the vehicle, a longitudinally extending swinging lever pivotally mounted on the frame and connected at opposite sides of its pivotal mounting to the rear wheel and to said second named lever means, the connection of said lever to said second named lever means being at a locality spaced outwardly of the pivotal connection of said second named lever means to the frame, said spring means being effective upon vertical swinging motion of either lever means to transmit vertical forces in corresponding directions to the frame at the locality of the inner ends of said lever means, compensating spring means connected to one lever means and independent of the other, and means for deflecting said compensating spring means in varying increments to vary the spring resistance thereof and to compensate for varying loads on the frame.

5. In a spring suspension for a vehicle having a frame and front and rear wheels at a longitudinal side of the frame, swinging lever means for each wheel pivotally connected to the frame at longitudinally spaced localities, longitudinal spring means common to the front and rear wheels and connected to said lever means, longitudinal lever means operatively connecting one wheel with one of said lever means outwardly of the pivotal connection thereof to the frame and adapted to swing the same in response to vertical motion of said wheel, compensating spring means connected to one wheel independently of the other wheel, and means for deflecting said compensating spring means to vary the spring resistance at one end of the frame relative to the opposite end.

6. In a spring suspension for a vehicle having a frame and front and rear wheels at a longitudinal side of the frame, swinging lever means for each wheel pivotally connected to the frame at longitudinally spaced localities, longitudinal spring means common to the front and rear wheels and connected to said lever means, longitudinal lever means operatively connecting one wheel with one of said lever means outwardly of the pivotal connection thereof to the frame and adapted to swing the same in response to vertical motion of said wheel, compensating spring means connected to one wheel independently of the other wheel, and means for deflecting said compensating spring means to vary the spring resistance at one end of the frame relative to the opposite end, said lever means in conjunction with said longitudinal spring means being effective to impart vertical forces in corresponding direction to the front and rear of the frame in response to vertical motion of either wheel.

7. In a spring suspension for a vehicle having a frame and front and rear wheels at a longitudinal side of the frame, swinging lever means for each wheel pivotally connected to the frame at longitudinally spaced localities, longitudinal spring means common to the front and rear wheels and connected to said lever means, longitudinal lever means pivotally connected to the frame intermediate its ends and operatively connecting one wheel with one of said lever means outwardly of the pivotal connection thereof to the frame and adapted to swing the same in response to vertical motion of said wheel, compensating spring means connected to one wheel independently of the other wheel, and means for deflecting said compensating spring means to vary the spring resistance at one end of the frame relative to the opposite end, said lever means in conjunction with said longitudinal spring means being effective to impart vertical forces in corresponding directions to the front and rear of the frame in response to vertical motion of either wheel.

8. A spring suspension to claim 6 in which the forward end of said longitudinal lever means is pivotally connected to the outer end of the lever means for the rear wheel.

9. In a spring suspension for a vehicle having a frame and front and rear wheels at a longitudinal side of the frame, swinging lever means for each wheel pivotally connected to the frame at longitudinally spaced localities, each of said lever means extending transversely of the frame and being pivotally connected at its inner end thereto, longitudinal spring means common to the front and rear wheels and connected to said lever means, longitudinal lever means pivotally connected to the frame intermediate its ends and operatively connecting one wheel with one of said lever means outwardly of the pivotal connection thereof to the frame and adapted to swing the same in response to vertical motion of said wheel, compensating spring means connected to one wheel independently of the other wheel, and means for deflecting said compensating spring means to vary the spring resistance at one end of the frame relative to the opposite end, said lever means in conjunction with said longitudinal spring means being effective to impart vertical forces in corresponding directions to the front and rear of the frame in response to vertical motion of either wheel.

10. A spring suspension according to claim 6 in which each lever means is vertically swingable and one of said lever means is connected to said compensating spring means to deflect the same simultaneously with the deflection thereby of said longitudinal spring means.

11. A spring suspension according to claim 5 in which said longitudinal spring means is torsional.

12. A spring suspension according to claim 6 in which said longitudinal spring means is torsional.

13. A spring suspension according to claim 5 in which said compensating spring means is torsional.

14. A spring suspension according to claim 6 in which said compensating spring means is torsional.

15. A spring suspension according to claim 5 in which the compensating spring means is effective to exert less resistance than said longitudinal spring means.

16. A spring suspension according to claim 6 in which the compensating spring means is effective to exert less resistance than said longitudinal spring means.

17. In a spring suspension for a vehicle having a frame and front and rear wheels at a longitudinal side of the frame, swinging lever means for each wheel pivotally connected to the frame at longitudinally spaced localities, longitudinal spring means common to the front and rear wheels and connected to said lever means, longitudinal lever means operatively connecting one wheel with one of said lever means outwardly of the pivotal connection thereof to the frame and adapted to swing the same in response to vertical motion of said wheel, compensating spring means connected to one wheel independently of the other wheel, and power actuated means for deflecting said compensating spring means to vary the spring resistance at one end of the frame relative to the opposite end, said lever means in conjunction with said longitudinal spring means being effective to impart vertical forces in corresponding directions to the front and rear of the frame in response to vertical motion of either wheel.

18. A spring suspension according to claim 17 in which said power actuated means comprises a reversible electric motor responsive to changes in static load at one end of the frame.

19. In a vehicle having a vehicle structure and front and rear wheels, a spring suspension common to said front and rear wheels and extending therebetween longitudinally of the vehicle structure, separate means operatively connecting said suspension to each wheel and acting on said suspension to effect displacement of opposite ends of the vehicle structure in corresponding directions upon vertical motion of a front wheel or a rear wheel, load compensating spring means connected to one wheel, power actuated means, means operatively connecting said power actuated means to said compensating spring means and acting on the latter to deflect the same thereby to vary the spring resistance at one end of the vehicle structure, the connection between said suspension and the rear wheel including a longitudinally extending lever fulcrumed intermediate its ends on the vehicle structure and also connected to the compensating spring means.

20. In a spring suspension for a vehicle having a frame and front and rear wheels, longitudinally extending lever arm means having a pivotal mounting on the frame to provide a longitudinal up and down swingable lever arm extending forwardly of the pivotal mounting, said lever arm means having a longitudinal up and down swingable lever arm extending rearwardly of the pivotal mounting, means for connecting one of said lever arms to a wheel, torsional spring means, swingable lever means for torsionally deflecting said spring means and having a transverse lever arm provided with an end portion adapted to swing up and down and disposed adjacent one end portion of the other of said longitudinal lever arms in vertically spaced relation thereto, and connecting means for inseparably interconnecting said vertically spaced end portions of said lever arms and swingable up and down therewith.

21. In a spring suspension for a vehicle having a frame and front and rear wheels, longitudinally extending lever arm means having a pivotal mounting on the frame to provide a longitudinal up and down swingable lever arm extending forwardly of the pivotal mounting, said lever arm means having a longitudinal up and down swingable lever arm extending rearwardly of the pivotal mounting, means for connecting one of said lever arms to a wheel, longitudinal torsional spring means common to the front and rear wheels, swingable lever means for torsionally deflecting said spring means and having a transverse lever arm provided with an end portion adapted to swing up and down and disposed adjacent one end portion of the other of said longitudinal lever arms in spaced relation thereto, link means for pivotally connecting said spaced end portions thereby to cause said transverse lever arm to swing in a vertical direction opposite to the vertical direction of movement of the adjacent wheel.

22. In a spring suspension for a vehicle having a frame and front and rear wheels, longitudinally extending swingable lever arm means having a pivotal mounting on the frame to provide a longitudinal lever arm extending forwardly of the pivotal mounting and having a forward end portion swingable up and down, said lever arm means having a longitudinal up and down swingable lever member extending rearwardly of the pivotal mounting and connected to a rear wheel, torsional spring means, swingable lever means connected to said torsional spring means for torsionally deflecting the same and having a transverse lever arm provided with an outer end portion adapted to swing up and down and disposed adjacent the forward end portion of said longitudinal lever arm in spaced relation thereto, and connecting means interposed between and pivotally interconnecting said end portions of said lever arms and swingable up and down therewith in inseparable pivotal relation thereto.

23. In a spring suspension for a vehicle having a frame and front and rear wheels, longitudinally extending lever arm means having a pivotal mounting on the frame to provide a longitudinal up and down swingable lever arm extending forwardly of the pivotal mounting, said lever arm means having a longitudinal up and down swingable lever arm extending rearwardly of the pivotal mounting, means for connecting one of said lever arms to a wheel, torsional spring means, swingable lever means for torsionally deflecting said spring means and having a transverse lever arm provided with an end portion adapted to swing up and down and disposed adjacent one end portion of the other of said longitudinal lever arms in spaced relation thereto, and connecting means interposed between and pivotally interconnecting said spaced end portions of said lever arms and swingable up and down therewith in inseparable pivotal relation thereto.

References Cited in the file of this patent

UNITED STATES PATENTS 2,607,610   Allison _________________ Aug. 19, 1952

FOREIGN PATENTS 45,936   France _________________ Jan. 8, 1936